(12) United States Patent
Liu et al.

(10) Patent No.: US 10,702,090 B2
(45) Date of Patent: Jul. 7, 2020

(54) IN-CAR COFFEE MAKER

(71) Applicant: Ningbo Jinyu Electrical Appliance Co., Ltd., Zhejiang (CN)

(72) Inventors: Shukuo Liu, Zhejiang (CN); Zhongyu Shi, Zhejiang (CN); Yue Luo, Zhejiang (CN)

(*) Notice: Subject to any disclaimer, the term of this patent is extended or adjusted under 35 U.S.C. 154(b) by 162 days.

(21) Appl. No.: 16/016,683

(22) Filed: Jun. 25, 2018

(65) Prior Publication Data

US 2019/0343320 A1    Nov. 14, 2019

(30) Foreign Application Priority Data

May 10, 2018    (CN) .......................... 2018 1 0476617

(51) Int. Cl.
*A47J 31/04* (2006.01)
*A47J 31/00* (2006.01)
*A47J 31/36* (2006.01)

(52) U.S. Cl.
CPC .............. *A47J 31/005* (2013.01); *A47J 31/04* (2013.01); *A47J 31/3695* (2013.01); *A47J 31/3676* (2013.01)

(58) Field of Classification Search
CPC .................................................. A47J 31/005; A47J 31/04; A47J 31/24; A47J 31/3676; A47J 31/3695
USPC ......................................................... 99/295
See application file for complete search history.

(56) References Cited

U.S. PATENT DOCUMENTS

| 10,219,647 B2* | 3/2019 | Richardson ........... A47J 31/057 |
| 2007/0221067 A1* | 9/2007 | Scelza ................... A47J 31/005 |
| | | 99/279 |

FOREIGN PATENT DOCUMENTS

| WO | WO-2017136311 A1 * | 8/2017 | ............ A47J 31/005 |
| WO | WO-2018222191 A1 * | 12/2018 | .............. A47J 31/02 |

* cited by examiner

*Primary Examiner* — Reginald Alexander
(74) *Attorney, Agent, or Firm* — Prakash Nama; Global IP Services, PLLC

(57) ABSTRACT

An in-car coffee maker, powered by DC12 or DC24 direct current voltage, has an outer shell; a water pump support rack is provided at an inner bottom part of the outer shell; a water pump is mounted in the water pump support rack; a circuit control board is mounted on the water pump support rack; a water inlet pipe and a water outlet pipe are mounted on the water pump; a heating element support rack is mounted on the circuit control board; a heating element is mounted on the heating element support rack; the heater element support rack is mounted with a water container; four legs of the water container are fitted to a periphery of the heating element support rack; a left side surface of the water container is provided with an insertion slot inserted with a button board; a button switch is mounted on the button board.

5 Claims, 3 Drawing Sheets

IN-CAR COFFEE MAKER

BACKGROUND OF THE INVENTION

The present invention relates to the technical field of coffee maker, and more specifically relates to a kind of in-car coffee maker.

Due to improvements in living standard, people also experience increased work pressure in a fast-paced working environment. A cup of coffee in the office or in a coffee shop can temporarily relieve the stress from work and can be emotionally soothing. Nowadays, transportation is well-developed and millions of families have their own cars which serve to broaden their owner's social circles. Cars are often used no matter for business trips, general commute or leisure trips. Cars become the indispensable items for daily lives. However, it is currently not possible to enjoy a hot coffee in a car because a traditional coffee maker has the following problems during use: Firstly, a traditional coffee maker is powered by AC current and is therefore not suitable to be used in cars; and secondly, a traditional coffee maker is large and structurally complicated and thus not convenient for portable usage.

BRIEF SUMMARY OF THE INVENTION

In view of the aforesaid disadvantages now present in the prior art, the present invention provides an in-car coffee maker powered by DC12 or DC24 direct current voltage that can achieve water heating as well as coffee making by using lower and upper piercing pins that pierce a coffee capsule inside the brewing seat. The present invention has a low cost, a small size and is powered by direct current, thereby significantly facilitating in-car coffee making.

An in-car coffee maker, comprising an outer shell; a water pump support rack is provided at an inner bottom part of the outer shell; a water pump is mounted in the water pump support rack; a circuit control board is mounted on the water pump support rack; a water inlet pipe and a water outlet pipe are mounted on the water pump.

A heating element support rack is mounted on the circuit control board; a heating element is mounted on the heating element support rack.

A surface of the heater element support rack is mounted with a water container; four legs of the water container at a bottom surface of the water container are fitted to a periphery of the surface of the heating element support rack; a left side surface of the water container is provided with an insertion slot inserted with a button board; a button switch is mounted on the button board; a water inlet is provided at the bottom surface of the water container; a first sealing ring is provided at the water inlet; the water inlet is connected with the water inlet pipe; a brewing seat is mounted at an inner upper portion of the water container; an inner bottom side of the brewing seat is provided with a lower piercing pin; a coffee capsule is mounted in the brewing seat; a second sealing ring and an inner cover are arranged on the brewing seat.

A bottom side of the inner cover is provided with a third sealing ring and an upper piercing pin; a surface of the inner cover is provided with a cover water pipe in communication with the water outlet pipe; an outer cover is mounted on the inner cover; a left side of the outer cover is provided with a cover button; an axial shaft to a right side of the cover button is provided with a spring; a bottom portion of the cover button is provided with a buckle corresponding to a buckling slot on a left side surface of the outer shell.

A water outlet is provided on the inner cover; a sealing piece is provided on the water outlet; a sliding slot is provided on the outer cover; a slider is disposed in the sliding slot; a slot at a bottom surface of the slider is mounted with the sealing piece; the slider slides to carry the sealing piece to open or block the water outlet.

The inner cover and the outer cover form a cover body; the cover body is hinged with a right side surface of the outer shell via a rotational shaft.

Further, a water proof element is provided at the buckling slot of the outer shell.

Further, a heating element temperature sensor and a water temperature sensor are mounted on the circuit control board.

Further, the heating element has a circular shape; a fourth sealing ring is provided on the heating element.

Further, a fifth sealing ring is mounted on the heating element temperature sensor.

The present invention has the following beneficial effects: the present invention is an in-car coffee maker powered by DC12 or DC24 direct current voltage that can achieve water heating as well as coffee making by using lower and upper piercing pins that pierce a coffee capsule inside the brewing seat. The present invention has a low cost, a small size and is powered by direct current, thereby significantly facilitating in-car coffee making.

BRIEF DESCRIPTION OF THE DRAWINGS

The drawings now described are intended for further understanding of the present invention and form part of this application. However, it is understood that the drawings do not improperly limit the present invention.

In the figures.

1-outer shell; 2-water pump; 3-water pump support rack; 4-water inlet pipe; 5-circuit control board; 6-heating element support rack; 7-water temperature sensor; 8- heating element temperature sensor; 9-fifth sealing ring; 10-heating element; 11-fourth sealing ring; 12-water container; 13-brewing seat; 14-lower piercing pin; 15-coffee capsule; 16-third sealing ring; 17-upper piercing pin; 18-second sealing ring; 19-inner cover; 20-cover water pipe; 21-sealing piece; 22-outer cover; 23-slider; 24-spring; 25-cover button; 26-water proof element; 27-button switch; 28-button board; 29-first sealing ring; 30-water outlet pipe; 31-water inlet.

DETAILED DESCRIPTION OF THE INVENTION

The present invention is further described in detail below with reference to an embodiment and the accompanying drawings. The schematic illustration and description of the embodiment are only intended to explain the present invention and should not limit the present invention.

Figure 1:
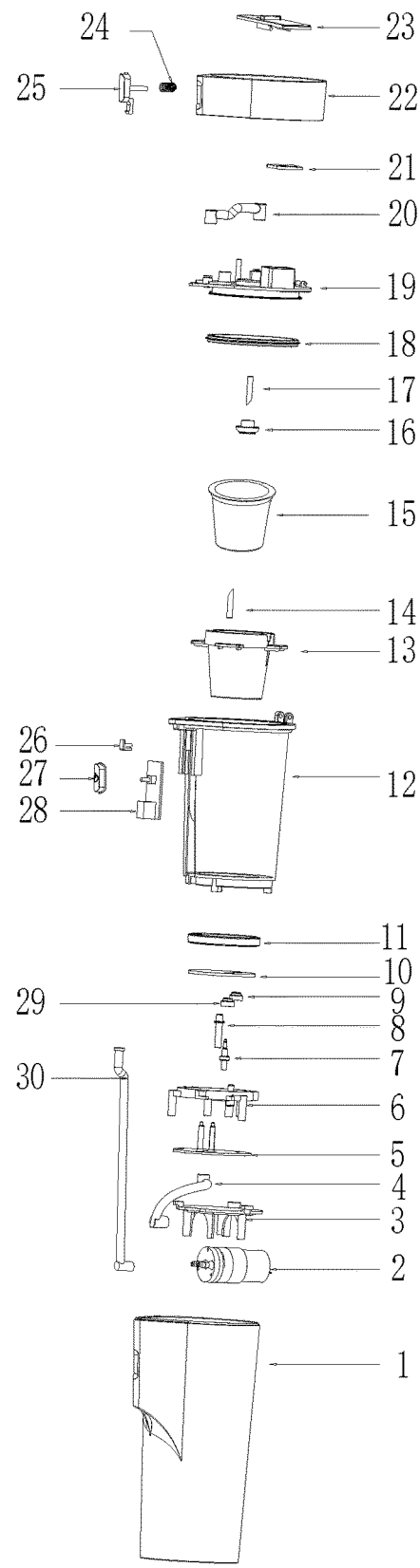
FIG. 1 is an exploded view of the present invention.
Figure 2:
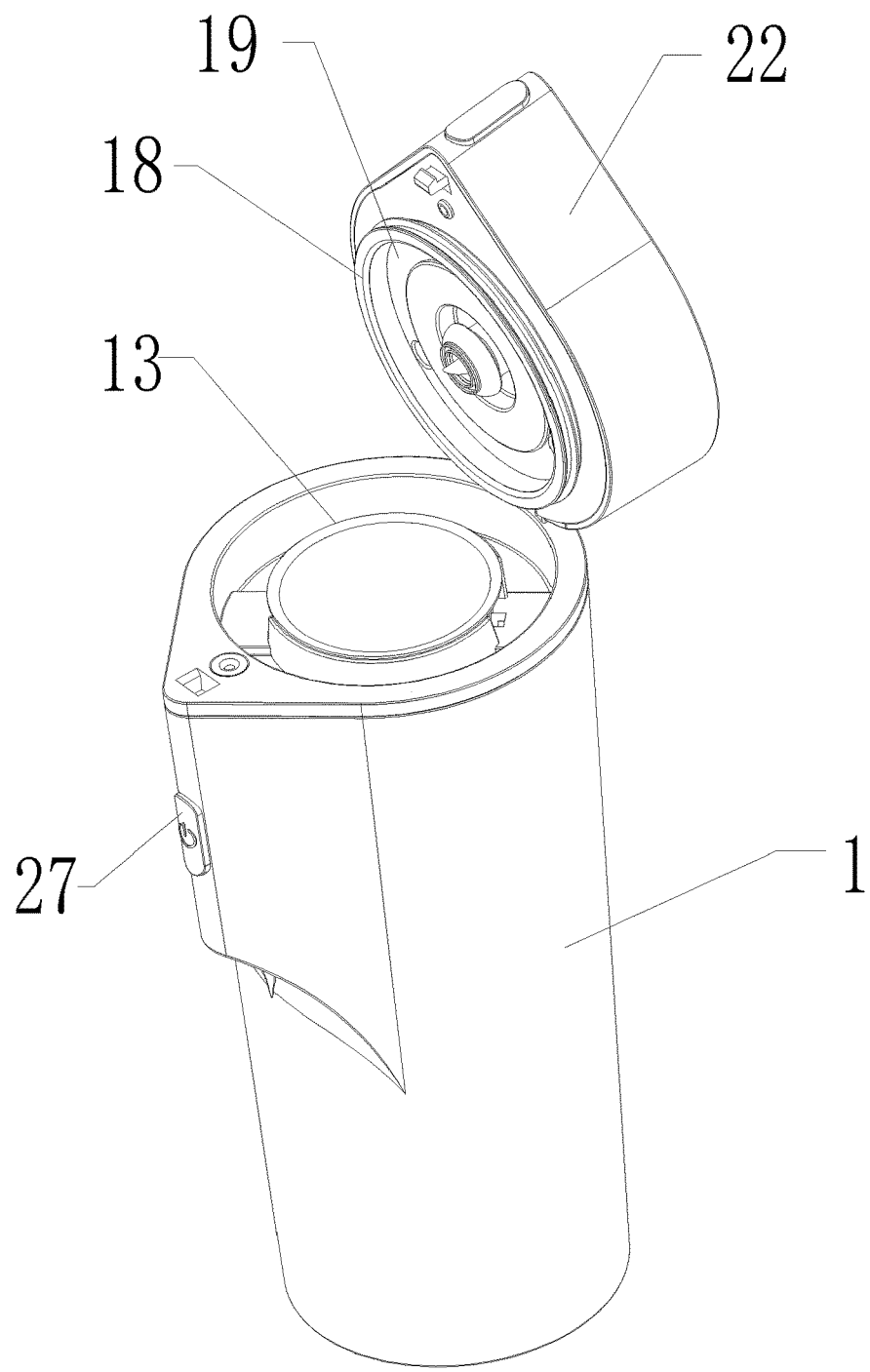
FIG. 2 is a perspective view of the present invention.
Figure 3:
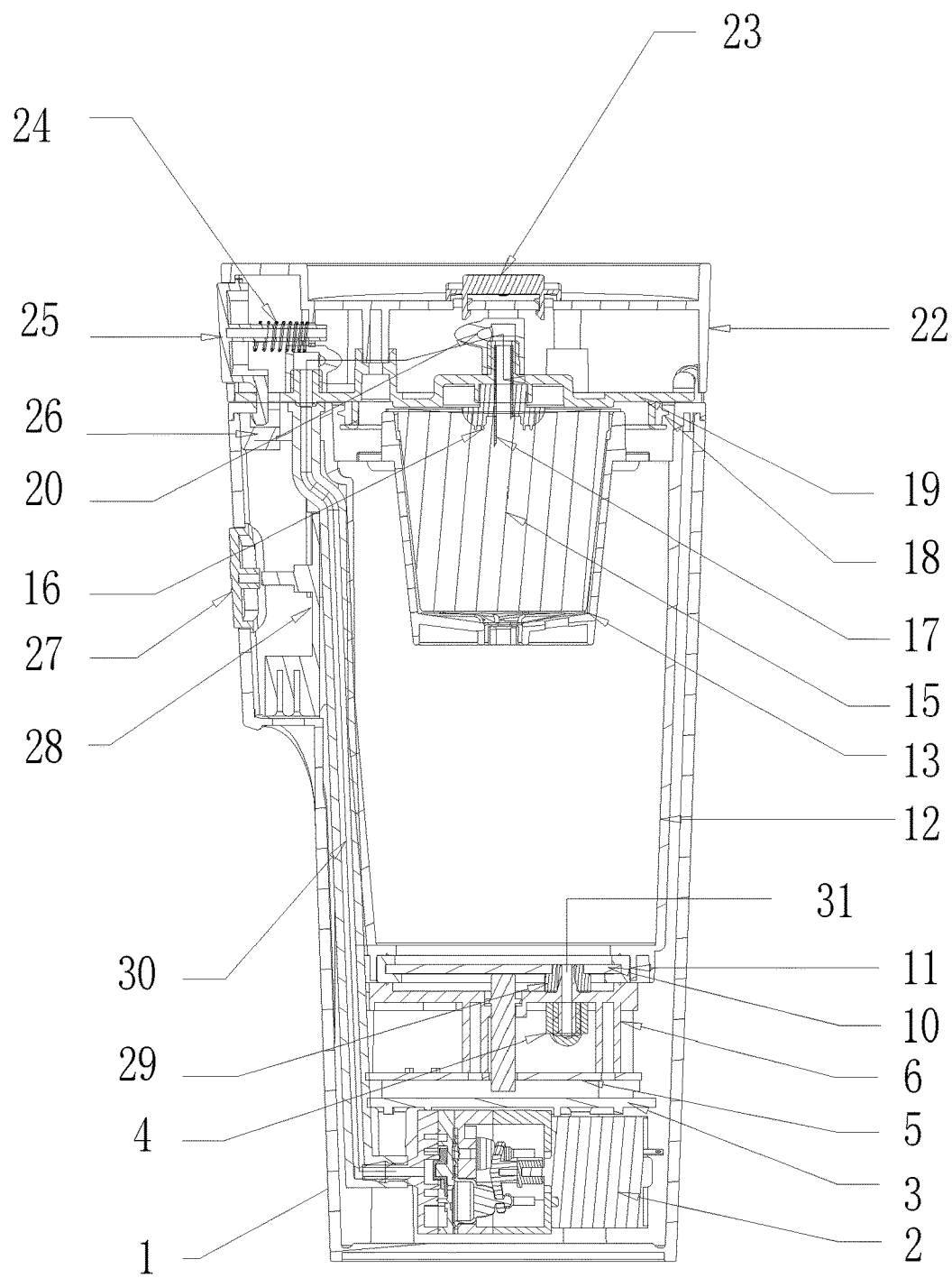
FIG. 3 is a sectional view of the present invention.

As shown in FIGS. 1-3, an in-car coffee maker according to the present embodiment comprises an outer shell 1; a water pump support rack 3 is provided at an inner bottom part of the outer shell 1; a water pump 2 is mounted in the water pump support rack 3; a circuit control board 5 is mounted on the water pump support rack 3; a water inlet pipe 4 and a water outlet pipe 30 are mounted on the water pump 2.

A heating element support rack 6 is mounted on the circuit control board 5; a heating element 10 is mounted on the heating element support rack 6.

A surface of the heater element support rack 6 is mounted with a water container 12; four legs of the water container 12 at a bottom surface of the water container 12 are fitted to a periphery of the surface of the heating element support rack 6; a left side surface of the water container 12 is provided with an insertion slot inserted with a button board 28; a button switch 27 is mounted on the button board 28; a water inlet 31 is provided at the bottom surface of the water container 12; a first sealing ring 29 is provided at the water inlet 31 the water inlet 31 is connected with the water inlet pipe 4; a brewing seat 13 is mounted at an inner upper portion of the water container 12; an inner bottom side of the brewing seat 13 is provided with a lower piercing pin 14; a coffee capsule 15 is mounted in the brewing seat 13; a second sealing ring 18 and an inner cover 19 are arranged on the brewing seat 13.

A bottom side of the inner cover 19 is provided with a third sealing ring 16 and an upper piercing pin 17; a surface of the inner cover 19 is provided with a cover water pipe 20 in communication with the water outlet pipe 30; an outer cover 22 is mounted on the inner cover 19; a left side of the outer cover 22 is provided with a cover button 25; an axial shaft to a right side of the cover button 25 is provided with a spring 24; a bottom portion of the cover button 25 is provided with a buckle corresponding to a buckling slot on a left side surface of the outer shell 1.

A water outlet is provided on the inner cover 19; a sealing piece 21 is provided on the water outlet; a sliding slot is provided on the outer cover 22; a slider 23 is disposed in the sliding slot; a slot at a bottom surface of the slider 23 is mounted with the sealing piece 21; the slider 23 slides to carry the sealing piece 21 to open or block the water outlet.

The inner cover 19 and the outer cover 22 form a cover body; the cover body is hinged with a right side surface of the outer shell 1 via a rotational shaft.

Further, a water proof element 26 is provided at the buckling slot of the outer shell 1.

Further, a heating element temperature sensor 8 and a water temperature sensor 7 are mounted on the circuit control board 5.

Further, the heating element 10 has a circular shape; a fourth sealing ring 11 is provided on the heating element 10.

Further, a fifth sealing ring 9 is mounted on the heating element temperature sensor 8.

The present invention has the following operation principle:

During use, adding water into the water container 12, inserting a coffee capsule 15 into the brewing seat 13, closing the cover body so that both the upper piercing pin on the bottom surface of the inner cover 19 and the lower piercing pin in the brewing seat 13 pierce the coffee capsule 15; switching on the button switch 27 so that the circuit control board 5 is controlled to operate, wherein the circuit control board 5 control operation of the heating element 10 and the water pump 2, and the heating element temperature sensor 8 and the water temperature sensor 7 control water conditions of the water inside the water container; next, heating the water in the water container by using the heating element 10, and then pumping out hot water from the water container 12 through the water inlet pipe 4 by using the pump 2 into the brewing seat 13 through the water outlet pipe 30; the hot water dissolves ingredients inside the coffee capsule 15 to make coffee for the user to enjoy.

In the present invention, the circuit control board 5 is powered by direct current which is DC12 or DC24. The direct current circuit of the circuit control board 5 belongs to prior art and will not be described in detail herein.

The present invention is an in-car portable capsule coffee maker that heats up and makes coffee automatically. The present invention has two kinds of power voltage inputs, which are DC12 and DC24V input power voltages. A portable capsule coffee maker allows coffee making to be ever simpler and more convenient. During operation, a single push of button can achieve coffee making after pouring a proper amount of water into the water container and inserting a coffee capsule into the brewing seat. Therefore, the user can enjoy a cup of coffee even on a car regardless of where the car goes. By contrast, a traditional capsule coffee maker has a relatively complicated structure and a larger size and is powered by AC current, all of which forbidding its use on a car.

The present invention is an in-car coffee maker powered by DC12 or DC24 direct current voltage that can achieve water heating as well as coffee making by using lower and upper piercing pins that pierce a coffee capsule inside the brewing seat. The present invention has a low cost, a small size and is powered by direct current, thereby significantly facilitating in-car coffee making.

The above description describes the preferred embodiment of the present invention. Changes or modifications achieving equivalent technical effects based on the structure, features and principle taught within the scope of the present invention should also fall within the scope of the present invention.

What is claimed is:

1. An in-car coffee maker, comprising an outer shell; a water pump support rack is provided at an inner bottom part of the outer shell; a water pump is mounted in the water pump support rack; a circuit control board is mounted on the water pump support rack; a water inlet pipe and a water outlet pipe are mounted on the water pump; a heating element support rack is mounted on the circuit control board; a heating element is mounted on the heating element support rack; a surface of the heater element support rack is mounted with a water container; four legs of the water container at a bottom surface of the water container are fitted to a periphery of the surface of the heating element support rack; a left side surface of the water container is provided with an insertion slot inserted with a button board; a button switch is mounted on the button board; a water inlet is provided at the bottom surface of the water container; a first sealing ring is provided at the water inlet; the water inlet is connected with the water inlet pipe; a brewing seat is mounted at an inner upper portion of the water container; an inner bottom side of the brewing seat is provided with a lower piercing pin; a coffee capsule is mounted in the brewing seat; a second sealing ring and an inner cover are arranged on the brewing seat; a bottom side of the inner cover is provided with a third sealing ring and an upper piercing pin; a surface of the inner cover is provided with a cover water pipe in communication with the water outlet pipe; an outer cover is mounted on the inner cover; a left side of the outer cover is provided with a cover button; an axial shaft to a right side of the cover button is provided with a spring; a bottom portion of the cover button is provided with a buckle corresponding to a buckling slot on a left side surface of the outer shell; a water outlet is provided on the inner cover; a sealing piece is provided on the water outlet; a sliding slot is provided on the outer cover; a slider is disposed in the sliding slot; a slot at a bottom surface of the slider is mounted with the sealing piece; the slider slides to carry the sealing piece to open or block the water outlet; the inner cover and the outer cover form a cover body; the cover body is hinged with a right side surface of the outer shell via a rotational shaft.

2. The in-car coffee maker of claim 1, wherein a water proof element is provided at the buckling slot of the outer shell.

3. The in-car coffee maker of claim 1, wherein a heating element temperature sensor and a water temperature sensor are mounted on the circuit control board.

4. The in-car coffee maker of claim 1, wherein the heating element has a circular shape; a fourth sealing ring is provided on the heating element.

5. The in-car coffee maker of claim 3, wherein a fifth sealing ring is mounted on the heating element temperature sensor.

* * * * *